United States Patent
Graham et al.

(10) Patent No.: US 6,369,811 B1
(45) Date of Patent: *Apr. 9, 2002

(54) AUTOMATIC ADAPTIVE DOCUMENT HELP FOR PAPER DOCUMENTS

(75) Inventors: Jamey Graham, Los Altos; Peter E. Hart, Menlo Park, both of CA (US)

(73) Assignee: Ricoh Company Limited, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/149,921

(22) Filed: Sep. 9, 1998

(51) Int. Cl.⁷ .............................. G06F 3/00; G06F 3/12
(52) U.S. Cl. ................ 345/349; 345/348; 345/349; 345/357; 345/339; 707/512; 358/1.18
(58) Field of Search ................. 345/339, 348, 345/349, 357; 358/1.18; 707/3, 104, 512, 517, 520

(56) References Cited

U.S. PATENT DOCUMENTS

| | | | |
|---|---|---|---|
| 4,417,239 A | 11/1983 | Demke et al. ............. 345/856 |
| 4,823,303 A | 4/1989 | Terasawa ................... 707/515 |
| 5,153,831 A | 10/1992 | Yianilos ..................... 707/531 |
| 5,309,359 A | 5/1994 | Katz et al. .................. 707/102 |
| 5,349,658 A | * 9/1994 | O'Rourke et al. ......... 345/349 |
| 5,384,703 A | 1/1995 | Withgott et al. ........... 707/531 |
| 5,404,295 A | 4/1995 | Katz et al. ...................... 707/2 |
| 5,418,948 A | 5/1995 | Turtle ............................ 707/4 |
| 5,442,795 A | * 8/1995 | Levine et al. ............... 345/349 |
| 5,479,600 A | 12/1995 | Wroblewski et al. |
| 5,481,666 A | 1/1996 | Nguyen et al. ............. 345/854 |
| 5,596,700 A | 1/1997 | Darnell et al. .............. 707/512 |
| 5,638,543 A | 6/1997 | Pederson et al. ............. 704/1 |
| 5,680,636 A | 10/1997 | Levine et al. ............... 707/512 |
| 5,694,559 A | * 12/1997 | Hobson et al. ............. 707/3 X |
| 5,737,599 A | 4/1998 | Rowe et al. .................. 707/10 |

(List continued on next page.)

FOREIGN PATENT DOCUMENTS

| | | | |
|---|---|---|---|
| EP | 378 848 A2 | 7/1990 | |
| EP | 0 459 174 | * 5/1991 | ........... G06F/3/033 |
| EP | 737 927 A2 | 10/1996 | |
| EP | 762 297 A2 | 3/1997 | |
| EP | 802 492 A1 | 10/1997 | |
| GB | 2 137 788 | 10/1984 | |
| GB | 2 156 118 | 10/1985 | |
| GB | 2 234 609 | 2/1991 | |
| GB | 2 290 898 | 1/1996 | |
| JP | 8-297677 | 11/1996 | |

OTHER PUBLICATIONS

John Gliedman, "Virtual Office Managers," Computer Shopper, v18, n9, p290 (1), Sep. 1998.*

(List continued on next page.)

*Primary Examiner*—Raymond J. Bayerl
*Assistant Examiner*—X. L. Bautista
(74) *Attorney, Agent, or Firm*—Townsend and Townsend and Crew LLP

(57) ABSTRACT

A reader's annotation assistant application for documents in paper form is provided by virtue of the present invention. In certain embodiments, an elongated thumbnail image of all or part of an electronically stored document is imprinted on each page of the printed form of the document. Sections of the document of interest to the reader are emphasized in the elongated thumbnail image. The emphasized area in the elongated thumbnail image assists the user with the selection of sections or pages of the document having particular interest to the user. The operation of the assistant is personalized for a particular user by setting of a sensitivity level and selection of relevant topics of interest. Some embodiments of the assistant are also capable of improved performance over time by both automatic and manual feedback. The assistant is usable with many popular electronic document formats.

25 Claims, 13 Drawing Sheets

U.S. PATENT DOCUMENTS

| | | | | |
|---|---|---|---|---|
| 5,748,805 A | | 5/1998 | Withgott et al. | 382/306 |
| 5,761,655 A | * | 6/1998 | Hoffman | 707/3 X |
| 5,778,397 A | | 7/1998 | Kupiec et al. | 707/500 |
| 5,781,785 A | | 7/1998 | Rowe et al. | 707/513 |
| 5,784,616 A | | 7/1998 | Horvitz | 709/102 |
| 5,819,301 A | | 10/1998 | Rowe et al. | 707/513 |
| 5,832,474 A | | 11/1998 | Lopresti et al. | 707/2 |
| 5,838,317 A | * | 11/1998 | Bolnick et al. | 345/339 |
| 5,857,185 A | | 1/1999 | Yamaura | 707/5 |
| 5,870,770 A | | 2/1999 | Wolfe | 345/805 |
| 5,873,107 A | | 2/1999 | Borovoy et al. | 707/501.1 |
| 5,943,679 A | | 8/1999 | Niles et al. | 707/526 |
| 5,946,678 A | | 8/1999 | Aalbersberg | 707/3 |
| 5,950,187 A | | 9/1999 | Tsuda | 707/3 |
| 5,987,454 A | | 11/1999 | Hobbs | 707/4 |
| 6,006,218 A | | 12/1999 | Breese et al. | 707/3 |
| 6,021,403 A | | 2/2000 | Horvitz et al. | 406/705 |
| 6,026,409 A | * | 2/2000 | Blumenthal | 707/104 |
| 6,028,601 A | | 2/2000 | Machiraju et al. | 345/705 |
| 6,055,542 A | | 4/2000 | Nielsen et al. | 707/104.1 |
| 6,101,503 A | | 8/2000 | Cooper et al. | 707/104.1 |
| 6,182,090 B1 | | 1/2001 | Peairs | 700/500 |

OTHER PUBLICATIONS

Torfinn Taxt, "Segmentation of Document Images," IEEE, vol. 11, issue 12, pp. 1322–1329, Dec. 1989.*

Pat Langley, "An Analysis of Bayesian Classifiers," Proceedings of the Tenth National Conference on Artificial Intelligence, pp. 223–228, 1992.*

Pat Langley, "Induction of Selective Bayesian Classifiers," Proceedings of the Tenth National Conference on Uncertainty in Artificial Intelligence, pp. 400–406, 1994.*

Ball et al., "Software Visualization in the Large", *IEEE Computer*, 29(4): 33–43 (Apr. 1996).

Hill et al., "Edit Wear and Read Wear", *ACM*, pp. 3–9 (May 3–7, 1992).

Adobe Systems, Inc., "Adobe Photoshop 4.0 User Guide for Macintosh and Windows," 1996, Title Page, Copyright Page, Chap. 2, pp. 30–31.

Acrobat Reader Version 2.0 (software application), Adobe Systems Incorporated, screenshots Figures 1–10 (1994).

Adobe Acrobat Reader 3.0 screen dumps (fig. 1–3), (1996).

Apple Macintosh system 7 reference manual, pp. 30–31(1991).

Boguraev et al., "Salience–Based Content Characterisation of Text Documents," *Proceedings of the ACL/EACL Workshop on intellegent [Sic] Scalable Text Summarization*, 1997. Topic identification, Discourse–based summarization. pp. 1–12.

Brandow et al., "Automatic Condensation of Electronic Publications by Sentence Selection," *Information Processing and Management*, 31 (5):675–685 (1995).

Greenberg, et al., "Sharing fisheye views in relaxed–WYSIWIS groupware applications," *Proceedings of Graphics Interface*, Toronto, Canada, May 22–24, 1995, Distributed by Morgan–Kaufmann, pp. 28–38, http://www.cpsc.ucalgary.ca/grouplab/papers/1996/96–Fisheye.GI/gi96 fisheye-.html.

Hearst et al., "TileBars: Visualization of Term Distribution Information in Full Text Information Access," *Proceedings of the ACM SIGCHI Conference on Human Factors in Computing Systems(CHI)*, Denver, CO., May 1995, pp. 1–8, http://www.acm.org/sigchi/chi95/Electronic/documnts/paperslmah bdy htm.

Manber, U., "The Use of Customized Emphasis in Text Visualization," *Proceedings of 1997 IEEE Conf. on Information Visualization*, pp. 132–138, held Aug. 27–29, 1997 in London England.

Schweighofer et al., "The Automatic Generation of Hypertext Links in Legal Documents," *Lecture Notes in Computer Science*, vol. 1134, Wagner et al., eds., from 7th Int. Conf., DEXA 96', held Sep. 1996 in Zurich, Switzerland (1996).

Sumita et al., "Document Structure Extraction for Interactive Dcoument Retrieval Systems," *Proceedings of SIGDOC 93*, pp. 301–310, held Oct. 5–8, 1993 in Kitchner, Ontario.

Taghva et al., "An Evolution of an Automatic Markup System,"*SPIE*, 2422:317–327.

* cited by examiner

```
                         1002
1006                      /
 / <RH.ANOH.S NUMBER=4>         1008       1008
 | We have approached this challenge by introducing an
  <RH.ANOH CONCEPT="Intelligent Agents" SUBCONCEPT="intelligent agent" SEN-
   TENCE="4" NUMBER=1>intelligent agent </RH.ANOH> that analyzes interactions
   between user and<RH.ANOH CONCEPT="Bayes Inference" SUBCONCEPT=" expert system"
   SENTENCE="4" NUMBER=3>expert system <RH.ANOH> and automatically constructs
   database queries based on this analysis</RH.ANOH.S>. The user is unobtrusively
   notified when information relevant to the current diagnostic context has been
   returned, and may immediately access it if desired.  From the user's perspec-
   tive all database machinery is entirely transparent; indeed no formal query
   language is even made available.  Hence we term this approach query-free infor-
        mation retrieval. <p>                              1004
1006
                        /-1002
 / <RH.ANOH.S NUMBER=5>                    1008
 | As we hope will be apparent from what follows, the introduction of the
  <RH.ANOH CONCEPT="Intelligent Agents" SUBCONCEPT="intelligent agent" SEN-
   TENCE="5" NUMBER=2>intelligent agent </RH.ANOH> additionally offers one solu-
   tion to a fundamental problem facing designers of cooperative information
   systems: How can legacy systems of substantial complexity be integrated within
   a larger system context</RH.ANOH.S>? By requiring that all interactions with
   the legacy database be mediated by the agent, we have been able to isolate the
   database system cleanly while still supporting query-free information
        retrieval. <p>                       1004
1006
                       /-1002
 / <RH.ANOH.S NUMBER=6>                     1008
 | FIXIT is comprised of the three subsystems already mentioned: the probabilistic
  <RH.ANOH CONCEPT="Bayes Inference" SUBCONCEPT=" expert system" SENTENCE="6"
   NUMBER=4>expert system <RH.ANOH>, the legacy full-text database system (to
   which we added a new, semantically-based, indexing structure that supports lim-
   ited <RH.ANOH CONCEPT=Natural Language" SUBCONCEPT=" natural language" SEN-
   TENCE="6" NUMBER=a>natural language <RH.ANOH> queries), and the <RH.ANOH CON-
   CEPT="Intelligent Agents" SUBCONCEPT="intelligent agent" SENTENCE="6" NUM-   1006
   BER=3>intelligent agent </RH.ANOH> that effectively integrates
   them</RH.ANOH.S>. The following sections describe these system components, pro-
   vide implementation details, illustrate the runtime behavior of FIXIT, report
   on operational experience, and close with some observations about query-free
   information retrieval and the potential for generalizing the underlying para-
   digm.<p>    1004                  1008

<h2> FIXIT's System Components</h2>
We first describe the probabilistic expert sub-system and the information
retrieval sub-system. Before briefly describing these, we stress that our pur-
pose was not necessarily to advance the capabilities of the individual compo-
nents or indeed even to exploit fully the best current technology; instead, we
focus on their integration.<p>
<p>
```

*FIG. 10*

AUTOMATIC ADAPTIVE DOCUMENT HELP FOR PAPER DOCUMENTS

CROSS-REFERENCE TO RELATED APPLICATIONS

The following related commonly-owned copending application is being filed concurrently and is hereby incorporated by reference in its entirety for all purposes:

U.S. application Ser. No. 09/149,920, filed Sep. 9, 1998, entitled AUTOMATIC ADAPTIVE DOCUMENT PRINTING HELP SYSTEM.

Further, this application incorporates by reference the following commonly owned copending U.S. Patent Application in its entirety for all purposes:

U.S. patent application Ser. No. 08/995,616, entitled AUTOMATIC ADAPTIVE DOCUMENT HELP SYSTEM.

BACKGROUND OF THE INVENTION

The present invention relates to printing of electronic documents and more particularly to method and apparatus for augmenting the hard copy form of electronic documents with features to enhance the experience of reading or using the hard copy of an electronic document.

Increasingly, readers of documents are being called upon to assimilate vast quantities of information in a short period of time. To meet the demands placed upon them, readers find they must read documents "horizontally," rather than "vertically," i.e., they must scan, skim, and browse sections of interest in multiple documents rather than read and analyze a single document from beginning to end.

Documents are becoming more widely available in electronic form. Some documents are available electronically by virtue of their having been created using word processing software. Other electronic documents are accessible via the Internet. Yet others may become available in electronic form by virtue of being scanned in, copied, or faxed. Commonly assigned U.S. application Ser. No. 08/754,721, entitled AUTOMATIC AND TRANSPARENT DOCUMENT ARCHIVING, the contents of which are incorporated herein by reference for all purposes, details a system for generating electronic as well as hard copy format of documents.

However, the mere availability of documents in electronic form does not assist the reader in confronting the challenges of assimilating information quickly. Indeed, many time-challenged readers still prefer paper documents because of their portability and the ease of flipping through pages. Paper documents are easily taken along with the mobile reader, can be readily annotated with ordinary pen or pencil and can easily be passed along to another.

Certain tools take advantage of electronic documents to assist harried readers. Tools exist to search for documents both on the Internet and locally. Once a document is identified and retrieved, automatic summarization techniques, such as the Reader's Helper™, described in a commonly owned copending U.S. patent application Ser. No. 08/995,616, entitled AUTOMATIC ADAPTIVE DOCUMENT HELP SYSTEM, the contents of which are incorporated herein by reference for all purposes, helps the reader to find as well as assimilate the information he or she wants more quickly.

While efforts to create personal agents for reading online documents such as described above represent significant contributions to the field in their own right, many readers will continue to prefer paper format documents irrespective of advances made in the online document technology. However, there is heretofore no annotation assistant available to the reader who desires to work with printed hard copy of electronic documents.

What is needed is a document management system that helps the reader locate the information he or she wants more quickly in a printed copy of the document. The paper format document management system should be easily personalized, flexible and adaptive as well.

SUMMARY OF THE INVENTION

A reader's annotation assistant application for documents in paper form is provided by virtue of the present invention. In certain embodiments, an elongated thumbnail image of all or part of an electronically stored document is imprinted on each page of the printed form of the document. Sections of the document of interest to the reader are emphasized in the elongated thumbnail image. The emphasized area in the elongated thumbnail image assists the user with the selection of sections or pages of the document having particular interest to the user. The operation of the assistant is personalized for a particular user by setting of a sensitivity level and selection of relevant topics of interest. Some embodiments of the assistant are also capable of improved performance over time by both automatic and manual feedback. The assistant is usable with many popular electronic document formats.

In accordance with a first aspect of the present invention, a method for creating a paper format annotation for an electronically stored document includes a step of accepting user input indicating one or more user-specified concepts of interest. A step of analyzing the electronically stored document to identify locations of discussion of the user-specified concepts of interest is also included in the method. The method also includes a step of printing the electronic document, with each page being imprinted with its own unique elongated thumbnail image of the document indicating an approximate position of the page within the document, as well as locations of discussion of the user's concepts of interest in relation to that particular page.

In accordance with a second aspect of the present invention, a method for creating a paper format annotation for an electronically stored document includes a step of accepting user input indicating one or more user-specified concepts of interest. A step of analyzing the electronically stored document to identify locations of discussion of the user-specified concepts of interest using a probabilistic inference method, such as a Bayesian belief network or its equivalent to identify such locations, is also included in the method. The method can also include a step of displaying the elongated thumbnail image of a portion of the electronically stored document in a viewing area of a display. The method also includes a step of printing the electronic document, with each page being imprinted with its own unique elongated thumbnail image of the document, indicating an approximate position of the page within the document, as well as the locations of discussion of the user's concepts of interest in relation to that particular page.

In select embodiments, a step of printing a cover page having indications of the user-specified concepts of interest can also be part of the method.

Numerous benefits are achieved by way of the present invention over conventional techniques. In some embodiments, the present invention is more user friendly than conventional techniques. The present invention can provide a way for the user to work more efficiently with hard copy format of a large document which contain concepts of interest. Some embodiments according to the invention are easier to use than known techniques for working with documents in electronic format. These and other benefits are described throughout the present specification and more particularly below.

A further understanding of the nature and advantages of the inventions herein may be realized by reference to the remaining portions of the specification and the attached drawings.

BRIEF DESCRIPTION OF THE DRAWINGS

FIG. 10 depicts a portion of an HTML document processed in accordance with one embodiment of the present invention.

DESCRIPTION OF SPECIFIC EMBODIMENTS

The present invention provides a personalized system for printing documents with annotations based upon concepts of interest to a particular user. An embodiment according to the present invention has been reduced to practice under the name Reader's Helper™.

Computer System Usable for Implementing the Present Invention

Figure 1:
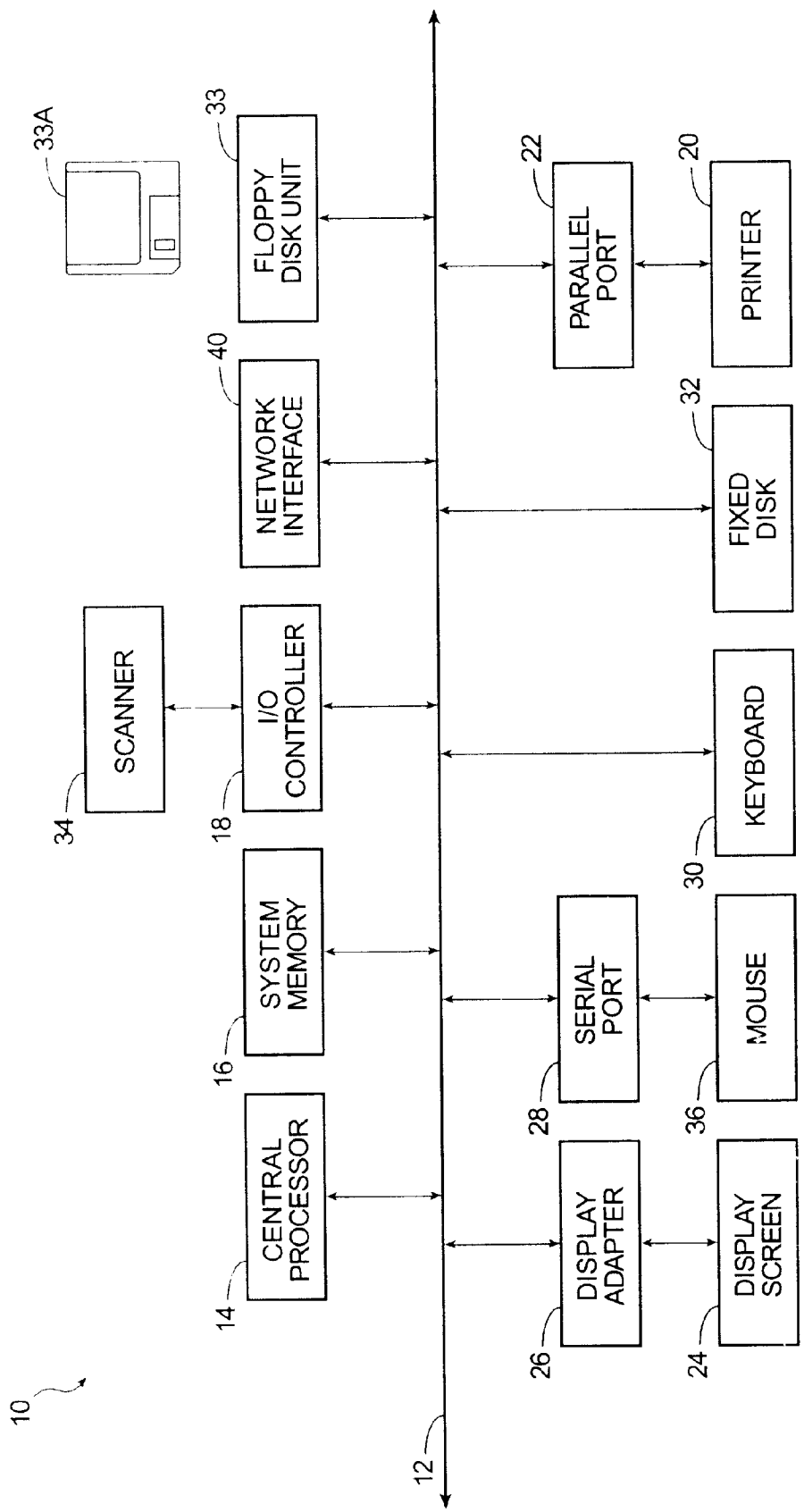
FIG. 1 depicts a representative computer system suitable for implementing the present invention.

FIG. 1 depicts a representative computer system suitable for implementing the present invention. FIG. 1 shows basic subsystems of a computer system 10 suitable for use with the present invention. In FIG. 1, computer system 10 includes a bus 12 which interconnects major subsystems such as a central processor 14, a system memory 16, an input/output controller 18, an external device such as a printer 20 via a parallel port 22, a display screen 24 via a display adapter 26, a serial port 28, a keyboard 30, a fixed disk drive 32 and a floppy disk drive 33 operative to receive a floppy disk 33A. Many other devices may be connected such as a scanner 34 via I/O controller 18, a mouse 36 connected to serial port 28 or a network interface 40. Many other devices or subsystems (not shown) may be connected in a similar manner. Also, it is not necessary for all of the devices shown in FIG. 1 to be present to practice the present invention, as discussed below. The devices and subsystems may be interconnected in different ways from that shown in FIG. 1. The operation of a computer system such as that shown in FIG. 1 is readily known in the art and is not discussed in detail in the present application. Source code to implement the present invention may be operably disposed in system memory 16 or stored on storage media such as a fixed disk 32 or a floppy disk 33A. Image information may be stored on fixed disk 32.

Annotated Documents

Figure 2:
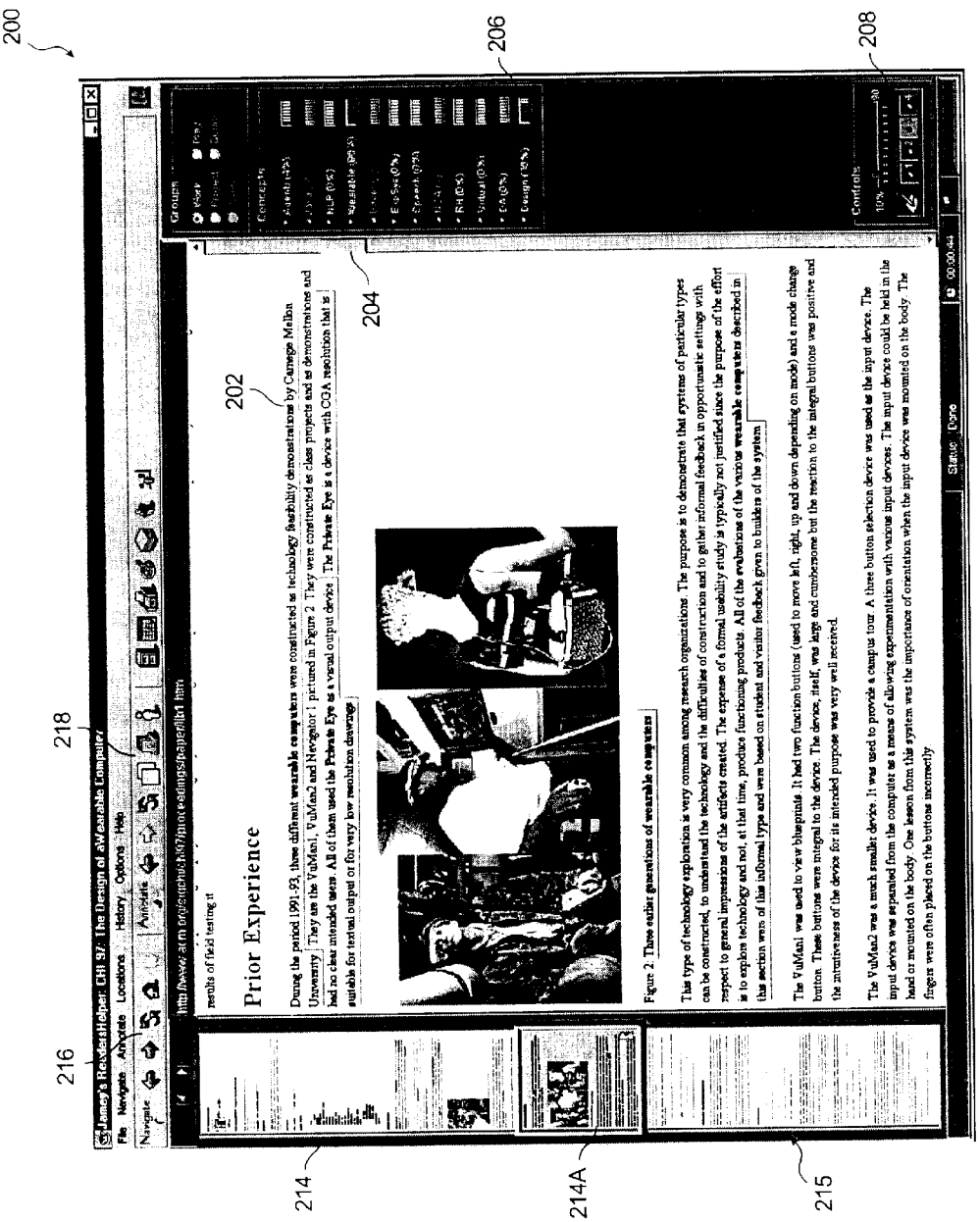
FIG. 2 depicts a representative document browsing display.

FIG. 2 depicts one user interface 200 for viewing an annotated document online, as described in commonly owned copending U.S. patent application Ser. No. 08/995,616, entitled AUTOMATIC ADAPTIVE DOCUMENT HELP SYSTEM, which is incorporated herein by reference in its entirety for all purposes. A first viewing area 202 in user interface 200 shows a section of an electronic document. Using a scroll bar 204, or in other ways, the user may scroll the displayed section through the electronic document.

A series of concept indicators 206 permit the user to identify which concepts of interest are to be noted in the document. A sensitivity control 208 permits the user to select the degree of sensitivity to apply in identifying potential locations of relevant discussion. At low sensitivity, more locations will be denoted as being relevant, even though some may not be of any actual interest. At high sensitivity, most all denoted locations will in fact be relevant but some other relevant locations may be missed. After each concept name appearing by one of concept indicators 206 appears a percentage giving the relevance of the currently viewed document to the concept. These relevance levels offer a quick assessment of the relevance of the document to the selected concepts.

An elongated thumbnail image 214 of the entire document is found in a second viewing area 215. Thumbnail image 214 depicts the document, the current location of the reader, i.e., the location of the text displayed in section 202, as well as annotations corresponding to locations of discussion of concepts of interest to the reader.

Miscellaneous navigation tools are found on a navigation toolbar 216. Miscellaneous annotation tools are found on an annotation toolbar 218. The annotation tools on annotation toolbar 218 facilitate navigation through a collection of documents.

Annotations may be added to the document to denote text relevant to user-selected concepts. The document need not include any special information to assist in locating discussion of concepts of interest. As will be explained further below, annotations added to any document available in electronic form, can also be useful to printed documents as well.

Annotations for Printed Documents

Figure 3A:
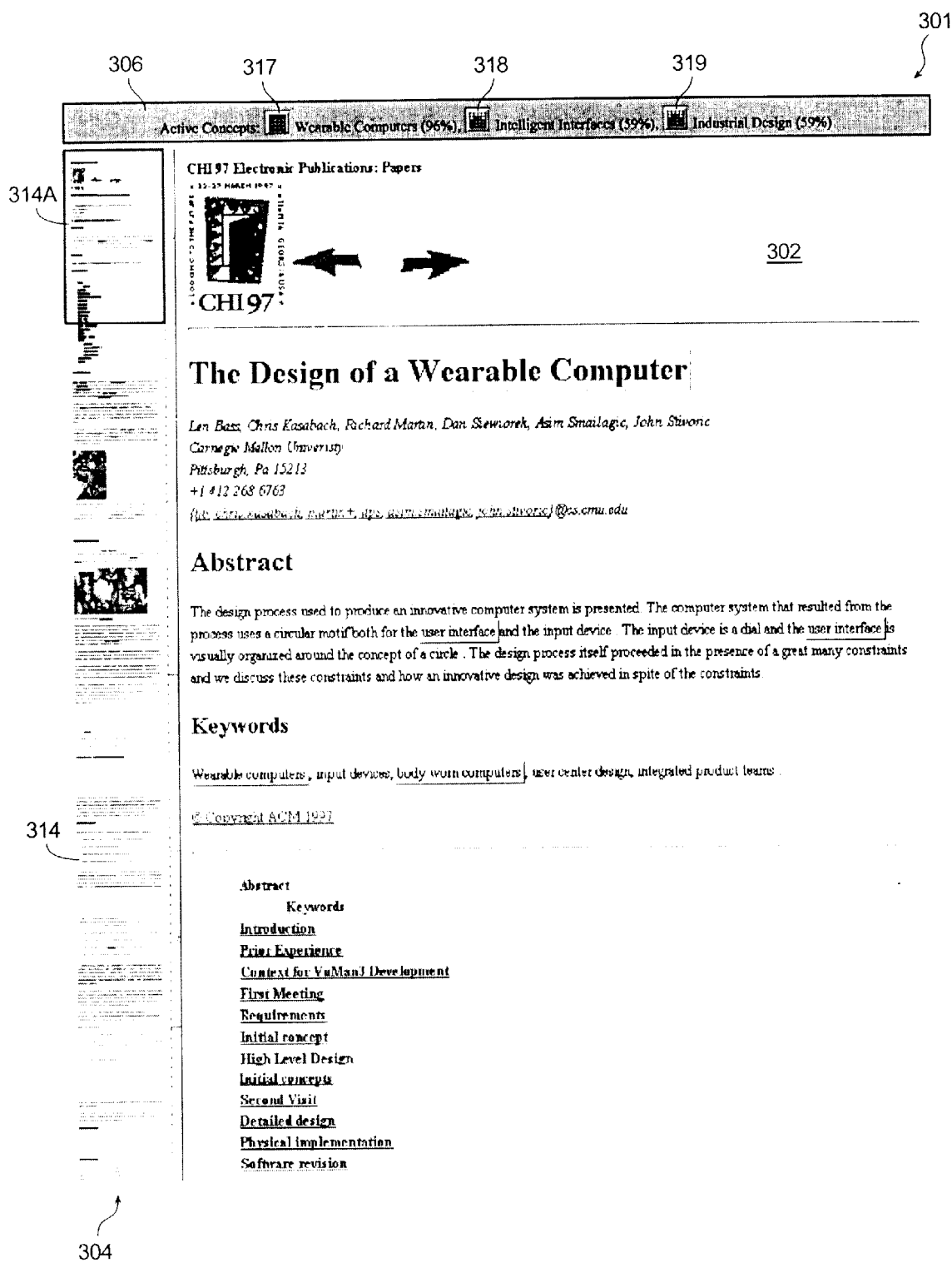
FIGS. 3A–3C depict representative printed document annotations in accordance with a specific embodiment of the invention.

FIG. 3A depicts a representative page 301 of a paper format document having annotations added in accordance with the present invention. Printed page 301 is divided into three sections. A first section 302 displays the document text for the page. A second section 304 displays an elongated thumbnail image 314 having an emphasized portion 314A, which corresponds to the content of page 301. Locations of concepts of interest to the user can be indicated to the user by highlighting, italic type or other indications within emphasized portion 314A. A third section 306 displays a plurality of concept indicators 317, 318 and 319. These concept indicators provide to the user the active concepts of interest discussed in the document. Other page formats having different arrangements or a greater or fewer number of sections may be used without departing from the scope of the present invention.

Figure 3B:
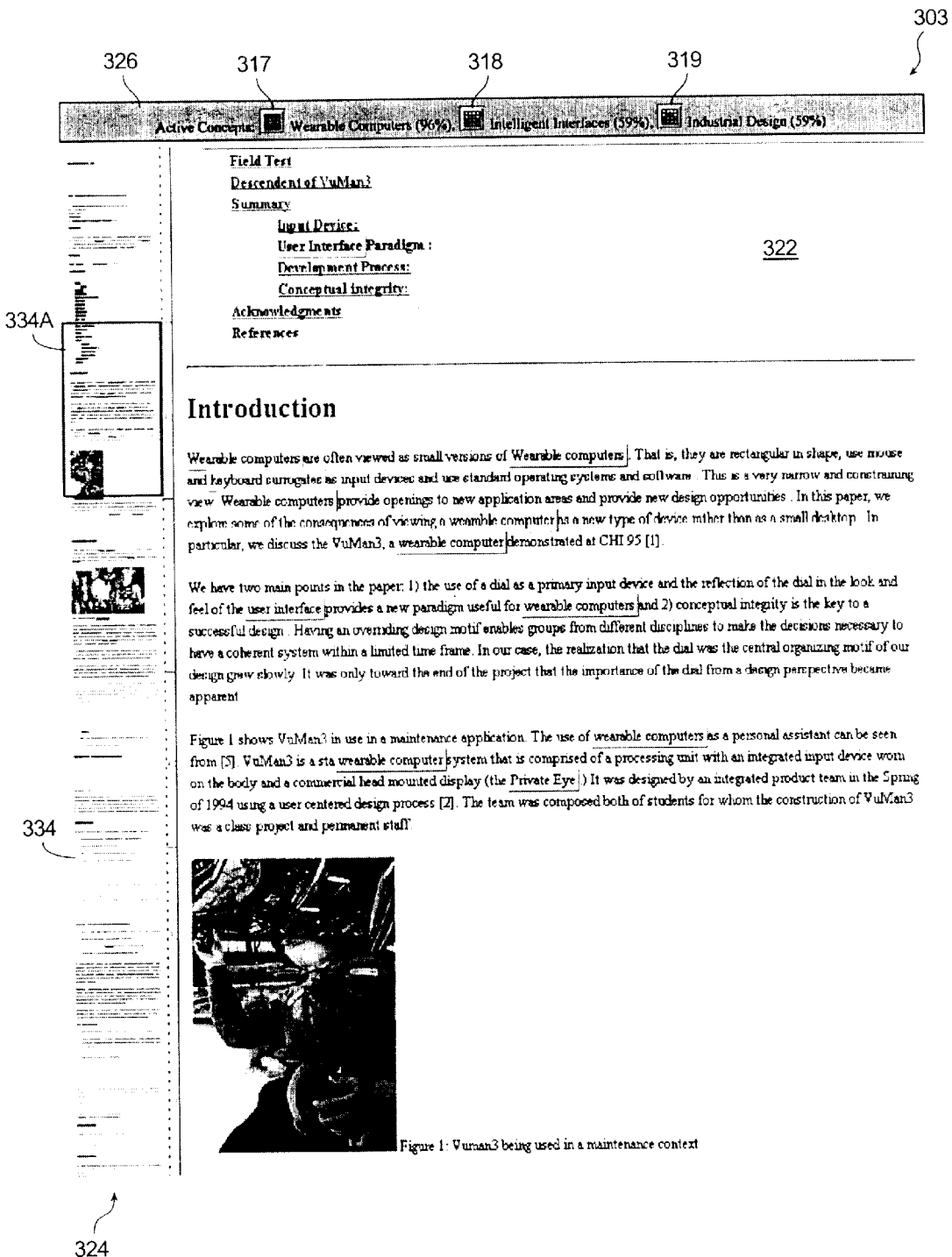

FIG. 3B depicts a second representative page 303 of a paper format document having annotations added in accordance with the present invention. Printed page 303 is also divided into three sections. A first section 322 displays the document text for page 303. Similarly, a second section 324 displays an elongated thumbnail image 334 having an emphasized portion 334A, which corresponds to the content of page 303. A third section 326 displays the plurality of concept indicators 317, 318 and 319. Contrasting emphasized portion 334A of elongated thumbnail image 334 of page 303 with emphasized portion 314A of elongated thumbnail image 314 of page 301, the utility to the reader of the printed thumbnail image becomes more evident. The position of the emphasized portion changes to reflect the location of the material on the page relative to the entire document. This assists the reader of the paper document in searching for locations of discussion of interesting concepts.

Figure 3C:
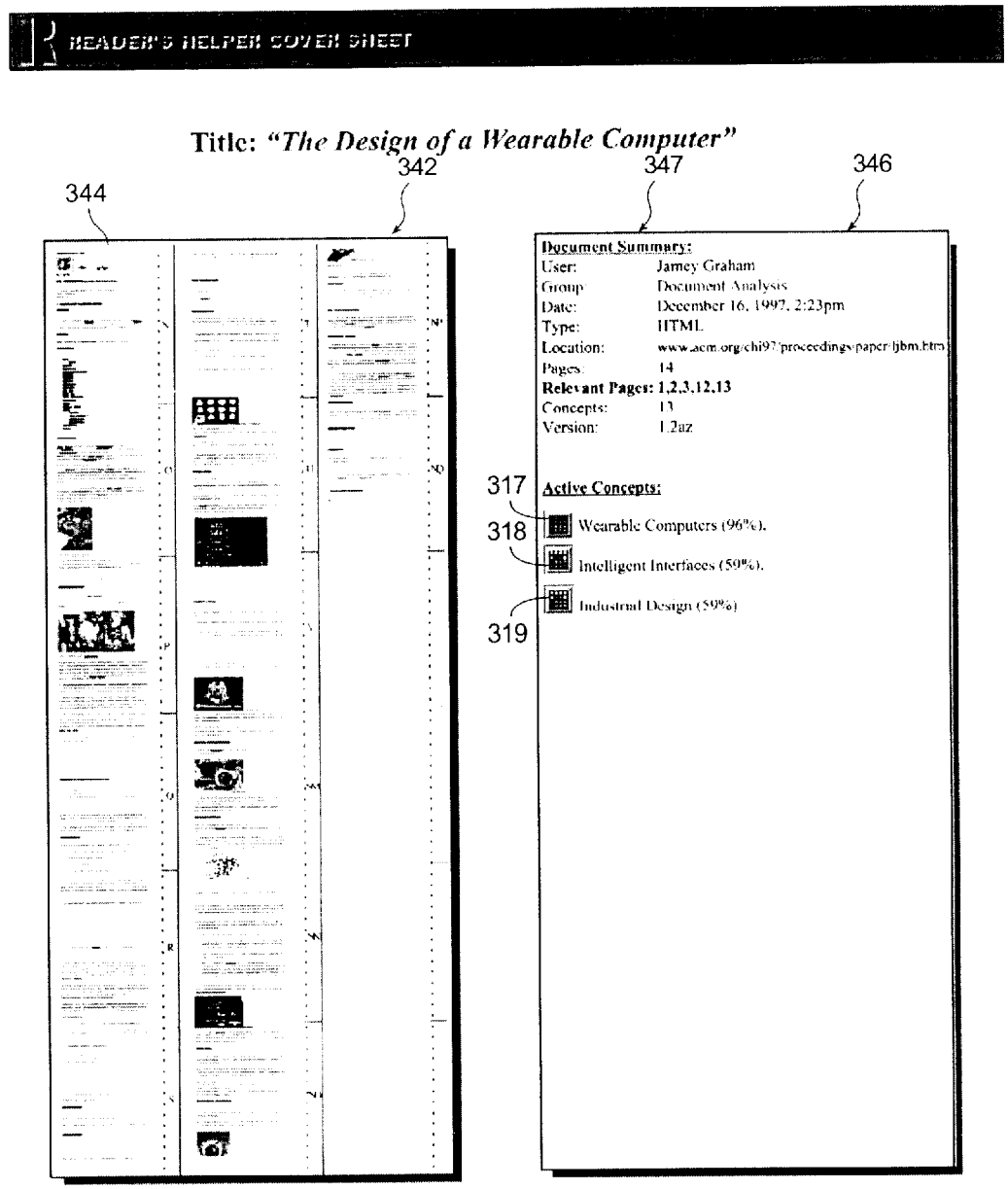

FIG. 3C depicts a representative cover page 305 which can be printed for a paper format document. Cover page 305 has two sections. A first section 342 displays an elongated thumbnail image 344 of the entire document. Elongated thumbnail image 344 enables the reader to locate pages in the paper document most relevant to the concepts of interest to the user. A second section 346 contains a document summary 347 and the plurality of concept indicators 317, 318 and 319. Concept indicators show the reader which concepts in the document compared most favorably with the concepts of interest to the reader stored in the reader's personal profile. Document summary 347 enables the reader to locate those pages most relevant to the concepts of interest to the reader.

Creating Printed Document Annotations

Figure 4A:
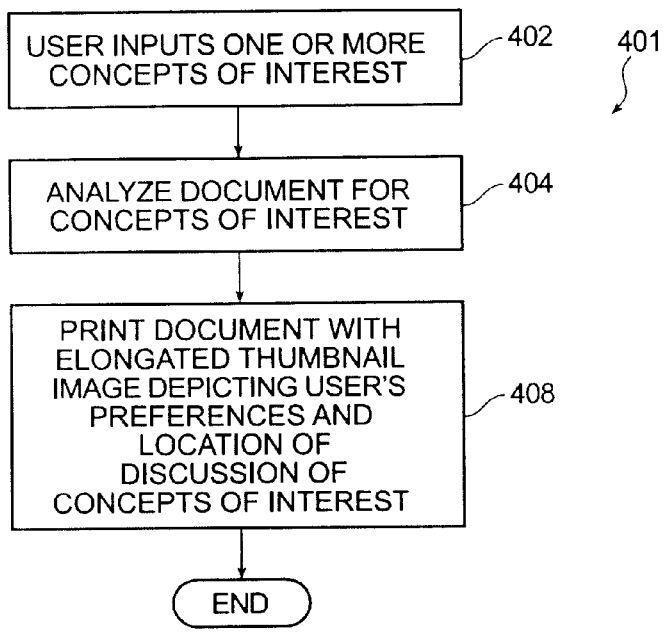
FIGS. 4A–4B depict simplified flowcharts of representative process steps in accordance with a particular embodiment of the invention.

FIG. 4A depicts a representative flowchart 401 of simplified process steps in a particular embodiment of the computer-implemented method for creating a paper format annotation for an electronically stored document in accordance with the present invention. In a step 402 user input indicating user-specified concepts of interest is accepted. Next, in a step 404, the electronic document is analyzed in order to identify locations of discussion of the concepts of interest to the user specified in step 402. Then, in a step 408, the electronic document is printed, with each printed page being imprinted with an elongated thumbnail image of the document, such as thumbnail image 314 in FIG. 3A. The printed elongated thumbnail image provides an indication to a reader of an approximate position of that particular page within the document, using a 'sliding emphasized window' style indicator 314A as well as an indication of the locations of discussion of the concepts of interest specified in step 402. Select embodiments will also include printing a cover page, such as cover page 305 of FIG. 3C, having indications of user-specified concepts of interest, such as complete document thumbnail image 344, summary information 347 and concept indicators 317, 318 and 319.

Figure 4B:
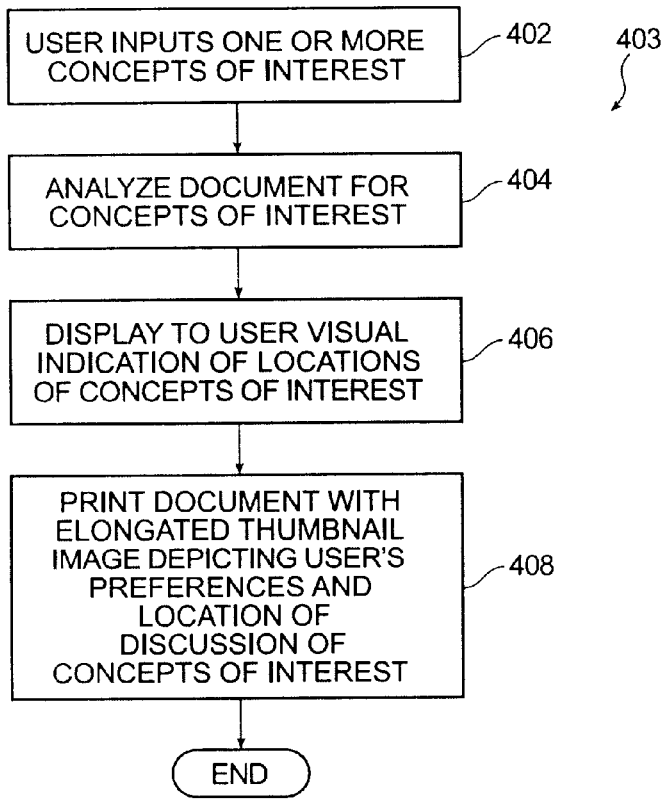

FIG. 4B depicts a representative flowchart 403 of simplified process steps in an alternative embodiment of the invention. In the embodiment of FIG. 4B, an additional step 406 of displaying visual indications of the locations of discussion of the concepts of interest to the user, such as the user interface 200 depicted in FIG. 2, is interposed between steps 404 and 408.

Automatic Annotation Software

Figure 5:
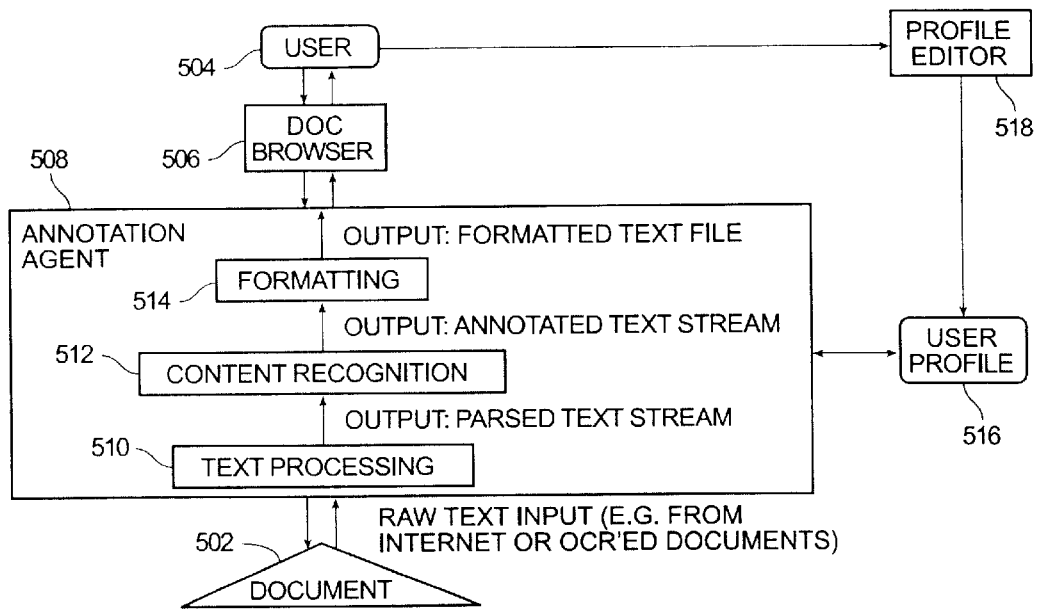
FIG. 5 depicts a top-level software architectural diagram for automatic annotation in accordance with one embodiment of the present invention.

FIG. 5 depicts a top-level software architectural diagram for analyzing electronically stored document 502 to produce annotated printed pages, such as page 301 of FIG. 3A and page 303 of FIG. 3B, in accordance with step 404 of FIGS. 4A–4B. The method for analyzing electronically stored document 502 is more fully detailed in a commonly owned copending U.S. patent application Ser. No. 08/995,616, entitled AUTOMATIC ADAPTIVE DOCUMENT HELP SYSTEM. Document 502 is stored in an electronic format. It may have been scanned in originally. It may be, e.g., in HTML, Postscript, LaTeX, other word processing or e-mail formats, etc. The description that follows assumes an HTML format. However, other formats may be used without departing from the scope of the present invention. A user 504 can access document 502 through many different tools, such as a document browser 506, an annotation agent 508 or printed elongated thumbnail 314.

Annotation agent 508 adds the annotations to document 502 to prepare it for viewing by the user 504. Processing by annotation agent 508 may be understood to be in three stages, a text processing stage 510, a content recognition stage 512, and a formatting stage 514. The input to text processing stage 510 is raw text. The output from text processing stage 510 and input to content recognition stage 512 is a parsed text stream, a text stream with formatting information such as special tags around particular words or phrases removed. The output from content recognition stage 512 and input to formatting stage 514 is an annotated text stream. The output of formatting stage 514 is a formatted text file which may be printed to produce pages 301 and 303.

The processing of annotation agent 508 may operate in the background as a batch process or foreground as a runtime task without departing from the scope of the present invention.

The annotation added by annotation agent 508 depends on concepts of interest selected by user 504. User 504 also inputs information used by annotation agent 508 to identify locations of discussion of concepts of interest in document 502. In a preferred embodiment, this information defines the structure of a Bayesian belief network. The concepts of interest and other user-specific information are maintained in a user profile file 516. User 504 employs a profile editor 518 to modify the contents of user profile file 516.

Figure 6A:
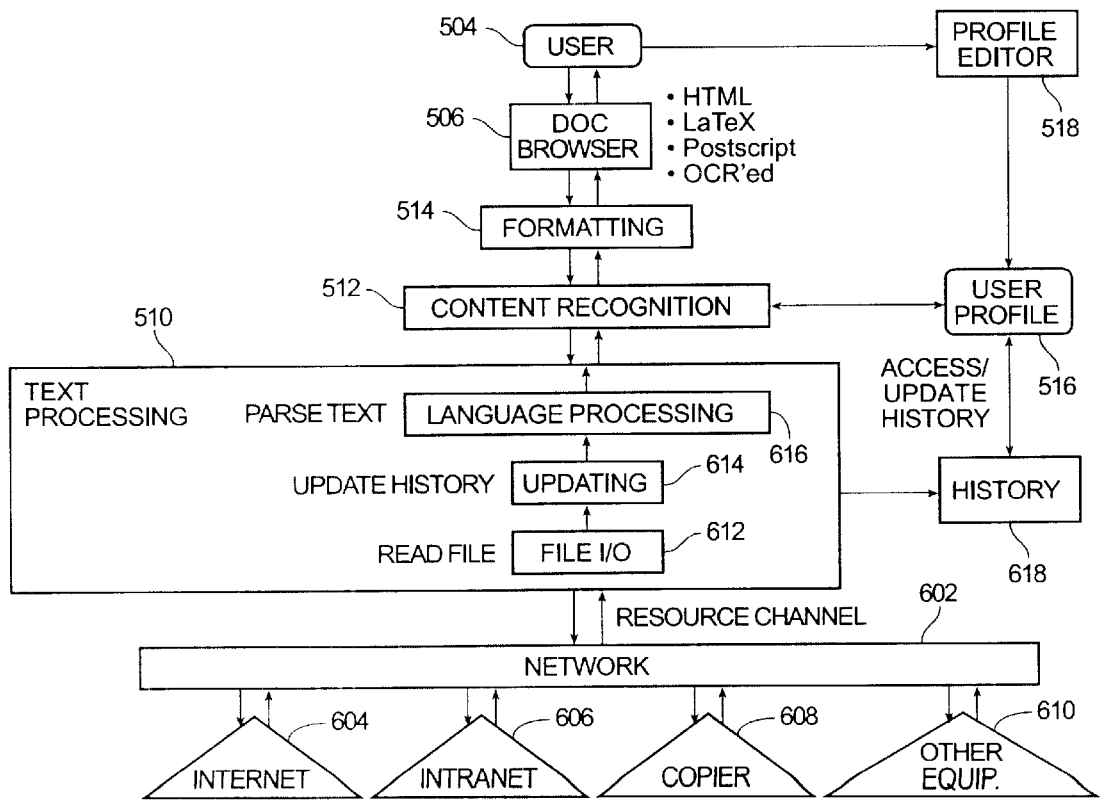
FIGS. 6A–6C depict a detailed software architectural diagram for automatic annotation in accordance with one embodiment of the present invention.

FIG. 6A depicts the automatic annotation software architecture of FIG. 5 with text processing stage 510 shown in greater detail. FIG. 6A shows that the source of document 502 may be accessed via a network 602. Possible sources include e.g., the Internet 604, an intranet 606, a digital copier 608 that captures document images, or other office equipment 610 such as a fax machine, scanner, printer, etc. Another alternative source is the user's own hard drive 32.

Text processing stage 510 includes a file I/O stage 612, an updating stage 614, and a language processing stage 616. File I/O stage reads the document file from network 602. Updating stage 614 maintains a history of recently visited documents in a history file 618. Language processing stage 616 parses the text of document 502 to generate the parsed text output of text processing stage 510.

Figure 6B:
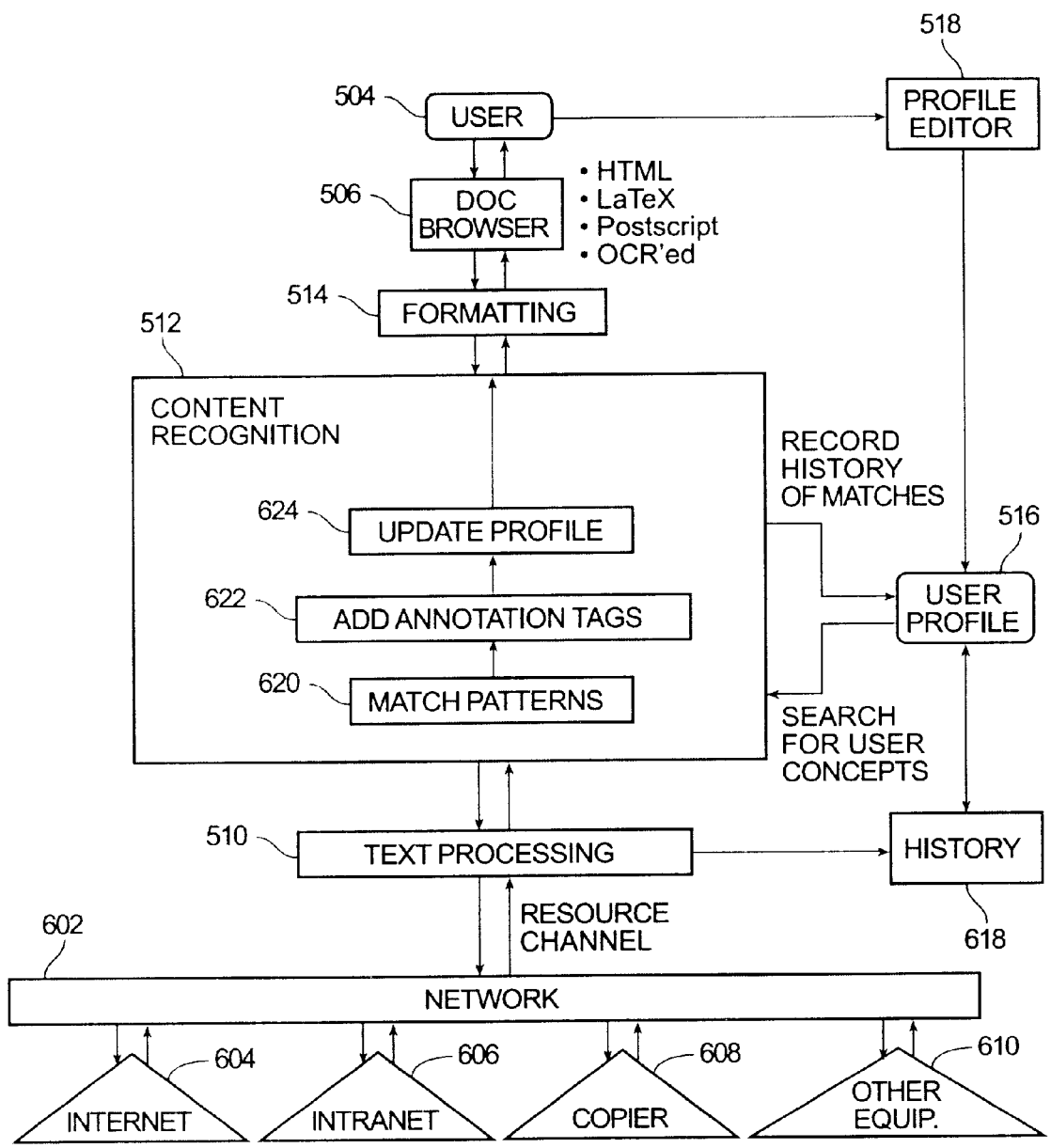

FIG. 6B depicts the automatic annotation software architecture of FIG. 5 with content recognition stage 512 shown in greater detail. A pattern identification stage 620 looks for particular patterns in the parsed text output of text processing stage 510. The particular patterns searched for are determined by the contents of user profile file 516. Once the patterns are found, annotation tags are added to the parsed text by an annotation tag addition stage 622 to indicate the pattern locations. In a preferred HTML embodiment, these annotation tags are compatible with the HTML format. However, the tagging process may be adapted to LaTeX, Postscript, etc. A profile updating stage 624 monitors the output of annotation tag addition stage 622 and analyzes text surrounding the locations of concepts of interest. As will be further discussed with reference to FIG. 7, profile updating stage 624 changes the contents of user profile file 516 based on the analysis of this surrounding text. The effect is to automatically refine the patterns searched for by pattern identification stage 620 to improve annotation performance.

Figure 6C:
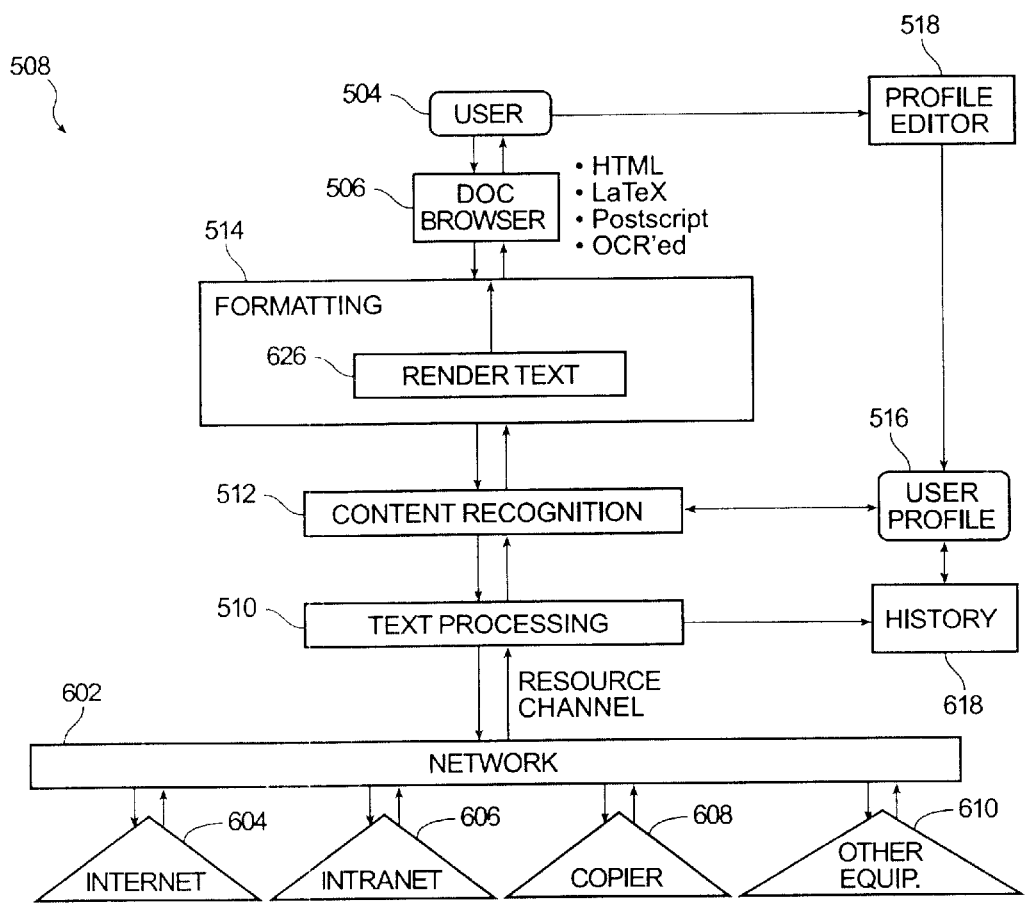

FIG. 6C depicts the automatic annotation software architecture of FIG. 5 with formatting stage 514 shown in greater detail. Formatting stage 514 includes a text rendering stage 626 that formats the annotated text provided by content recognition stage 512 to facilitate viewing by document browser 506 or in printed annotated form.

Pattern identification stage 620 looks for keywords and key phrases of interest and locates relevant discussion of concepts based on the located keywords. The identification of keywords and the application of the keywords to locating relevant discussion is preferably accomplished by reference to a belief system. The belief system is preferably a Bayesian belief network.

Figure 7:
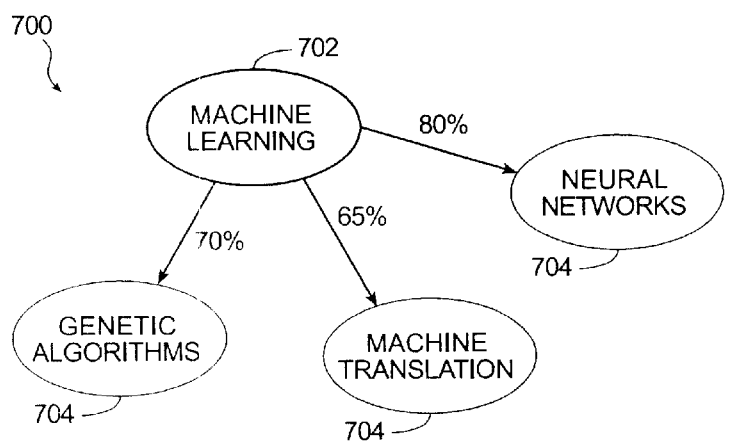
FIG. 7 depicts a representative Bayesian belief network useful in automatic annotation in accordance with one embodiment of the present invention.

FIG. 7 depicts a portion of a representative Bayesian belief network 700 implementing a belief system as used by pattern identification stage 622. A first oval 702 represents a particular user-specified concept of interest. Other ovals 704 represent subconcepts related to the concept identified by oval 702. Each line between one of subconcept ovals 704 and concept oval 702 indicates that discussion of the subconcept implies discussion of the concept. Each connection between one of subconcept ovals 704 and concept oval 702 has an associated probability value indicated in percent. These values in turn indicate the probability that the concept is discussed given the presence of evidence indicating the presence of the subconcept. Discussion of the subconcept is in turn indicated by one or more keywords or key phrases (not shown in FIG. 7).

The structure of Bayesian belief network 700 is only one possible structure applicable to the present invention. For example, one could employ a Bayesian belief network with more than two levels of hierarchy so that the presence of subconcepts is suggested by the presence of "subsubconcepts" and so on. In the preferred embodiment, presence of a keyword or key phrase always indicates presence of discussion of the subconcept but it is also possible to configure the belief network so that presence of a keyword or key phrase suggests discussion of the subconcept with a specified probability.

The primary source for the structure of Bayesian belief network 700 including the selection of concepts, keywords and key phrases, interconnections, and probabilities is user profile file 516. In a preferred embodiment, user profile file 516 is selectable for both editing and use from among profiles for many users.

The structure of belief system 700 is modifiable during use of the annotation system. The modifications may occur automatically in the background or may involve explicit user feedback input. The locations of concepts of interest determined by pattern identification stage 620 are monitored by profile updating stage 624. Profile updating stage 624 notes the proximity of other keywords and key phrases within each analyzed document to the locations of concepts of interest. If particular keywords and key phrases are always near a concept of interest, the structure and contents of belief system 700 are updated in the background without user input by profile updating stage 624. This could mean changing probability values, introducing a new connection between a subconcept and concept, or introducing a new keyword or key phrase.

User 504 may select a word or phrase in document 502 as being relevant to a particular concept even though the word or phrase has not yet defined to be a keyword or key phrase. Belief system 700 is then updated to include the new keyword or key phrase User 504 may also give feedback for an existing key word or key phrase, indicating the perceived relevance of the keyword or key phrase to the concept of interest. If the selected keyword or key phrase is indicated to be of high relevance to the concept of interest, the probability values connecting the subconcept indicated by the selected keywords or key phrases to the concept of interest increases. If, on the other hand, user 504 indicates the selected keywords or key phrases to be of little interest, the probability values connecting these keywords or key phrases to the concept decrease.

User Profile and Feedback Interfaces

Figure 8:
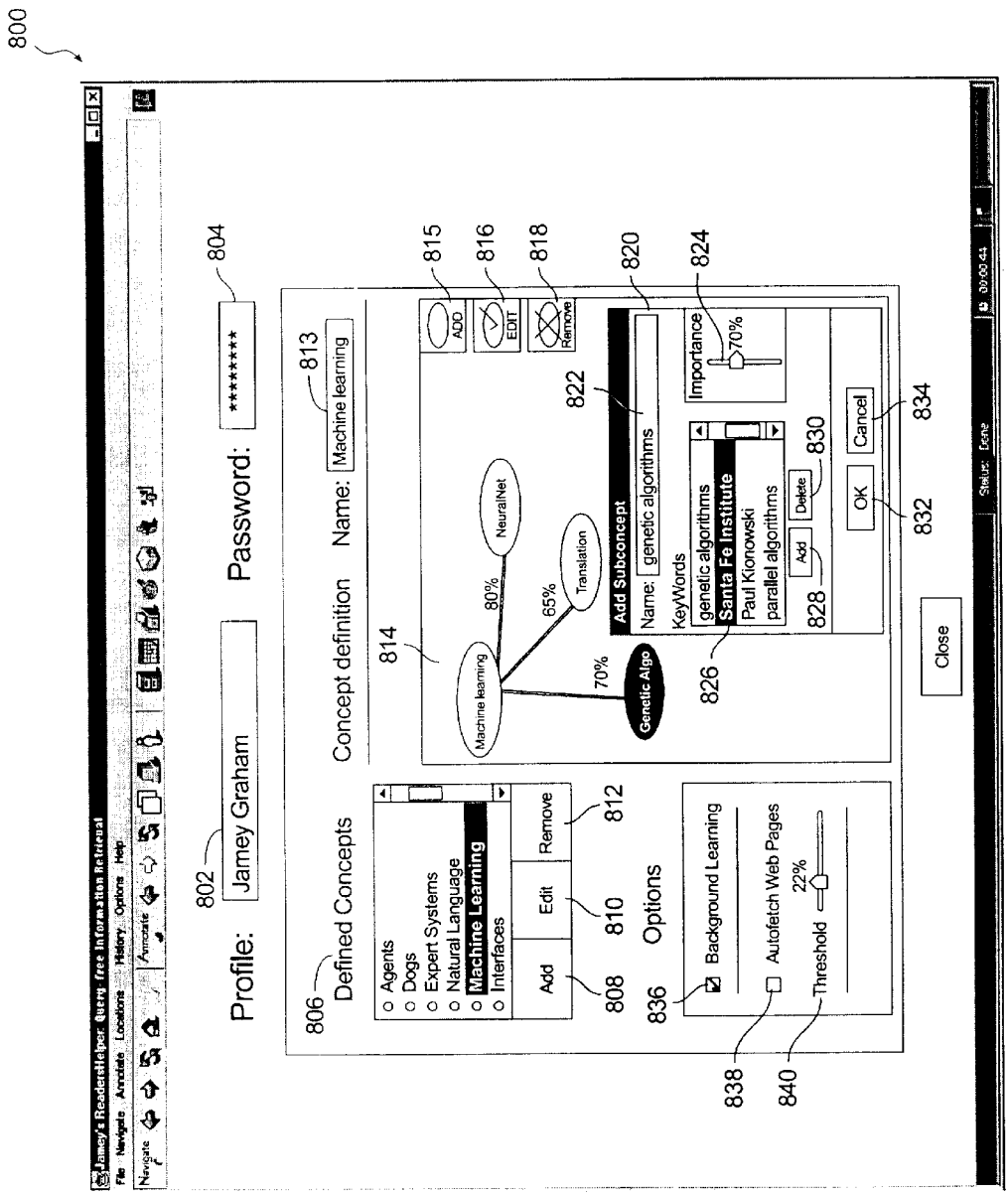
FIG. 8 depicts a user interface for defining a user profile in accordance with one embodiment of the present invention.

FIG. 8 depicts a user interface for defining a user profile in accordance with one embodiment of the present invention. User interface screen 800 is provided by profile editor 518. A profile name box 802 permits the user to enter the name of the person or group to whom the profile to be edited is assigned. This permits the annotation system according to the present invention to be personalized to particular users or groups. A password box 804 provides security by requiring entry of a correct password prior to profile editing operations.

A defined concepts list 806 lists all of the concepts which have already been added to the user profile. By selecting a concept add button 808, the user may add a new concept. By selecting a concept edit button 810, the user may modify the belief network as it pertains to the listed concept that is currently selected. By selecting a remove button 812, the user may delete a concept.

If a concept has been selected for editing, its name appears in a concept name box 813. The portion of the belief network pertaining to the selected concept is shown in a belief network display window 814. Belief network display window 814 shows the selected concept, the subconcepts which have been defined as relating to the selected concept and the percentage values associated with each relationship. The user may add a subconcept by selecting a subconcept add button 815. The user may edit a subconcept by selecting the subconcept in belief network display window 814 and then selecting a subconcept edit button 816. A subconcept remove button 818 permits the user to delete a subconcept from the belief network.

Selecting subconcept add button 815 causes a subconcept add window 820 to appear. Subconcept add window 820 includes a subconcept name box 822 for entering the name of a new subconcept. A slider control 824 permits the user to select the percentage value that defines the probability of the selected concept appearing given that the newly selected subconcept appears. A keyword list 826 lists the keywords and key phrases which indicate discussion of the subconcept. The user adds to the list by selecting a keyword add button 828 which causes display of a dialog box (not shown) for entering the new keyword or key phrase. The user deletes a keyword or key phrase by selecting it and then selecting a keyword delete button 830. Once the user has finished defining the new subconcept, he or she confirms the definition by selecting an OK button 832. Selection of a cancel button 834 dismisses subconcept add window 820 without affecting the belief network contents or structure. Selection of subconcept edit button 816 causes display of a window similar to subconcept add window 820 permitting redefinition of the selected subconcept.

By determining whether a background learning check box 836 has been selected, the user may enable or disable the operation of profile updating stage 624. A web autofetch check box 838 permits the user to select whether or not to enable an automatic web search process. When this web search process is enabled, whenever a particular keyword or key phrase is found frequently near where a defined concept is determined to be discussed, a web search tool such as AltaVista™ is employed to look on the World Wide Web for documents containing the keyword or key phrase. A threshold slider control 840 is provided to enable the user to set a threshold relevance level for this autofetching process.

Figure 9A:
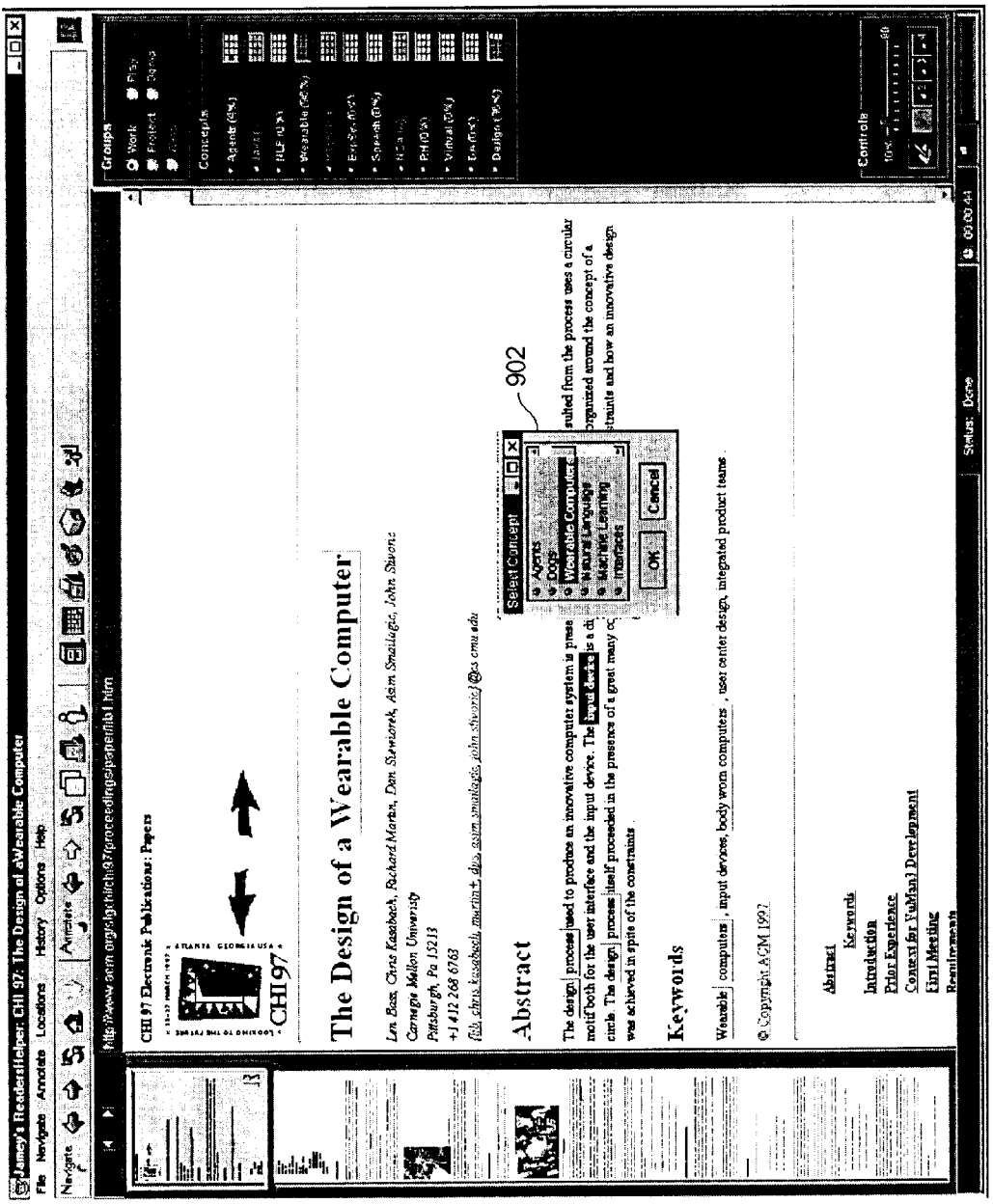
FIGS. 9A–9B depict an interface for providing user feedback in accordance with one embodiment of the present invention.
Figure 9B:
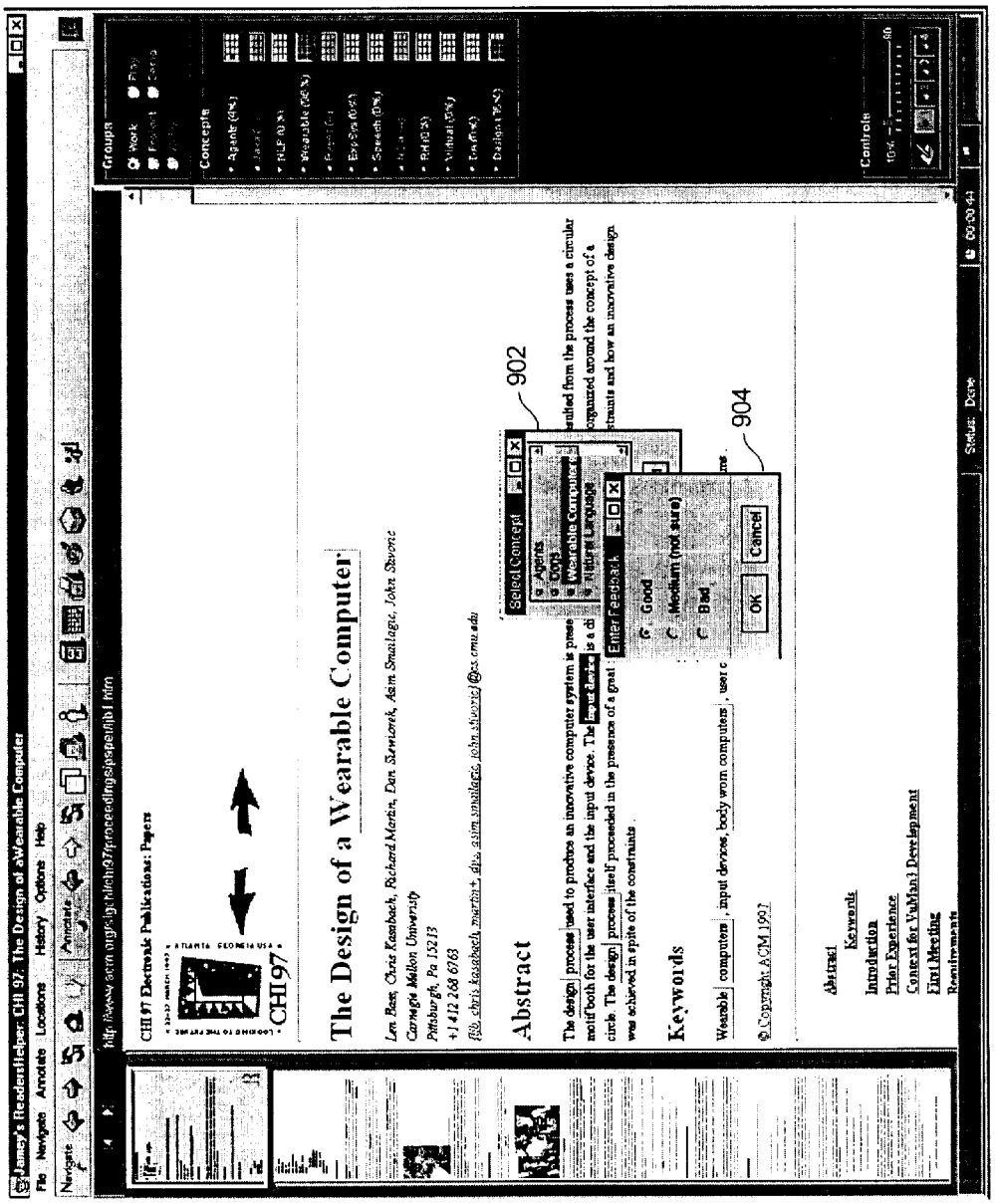

FIGS. 9A–9B depict a user interface for providing feedback in accordance with one embodiment of the present invention. User 504 may select any text and call up a first feedback window 902. The text may or may not have been previously identified by the annotation system as relevant. In first feedback window 902 shown in FIG. 9A, user 504 may indicate the concept to which the selected text is relevant. First feedback window 902 may not be necessary when adjusting the relevance level for a keyword or key phrase that is already a part of belief network 700. After the user selects a concept in first feedback window 902, a second feedback window 904 is displayed for selecting the degree of relevance. Second feedback window 904 in FIG. 9B provides three choices for level of relevance: good, medium (not sure), and bad. Alternatively, a slider control could be used to set the level of relevance. If the selected text is not already a keyword or key phrase in belief network 700, a new subconcept is added along with the associated new keyword or key phrase. If the selected text is already a keyword or key phrase, above, probability values within belief system 700 are modified appropriately in response to this user feedback.

FIG. 10 depicts a portion of an HTML document 1000 processed in accordance with one embodiment of the present invention. A sentence including relevant text is preceded by an a <RH.ANOH.S . . . > tag 1002 and followed by an </RH.ANOH.S> tag 1004. The use of these tags facilitates the annotation mode where complete sentences are highlighted. The <RH.ANOH.S . . . > tag 1002 includes a number indicating which relevant sentence is tagged in order of appearance in the document. Relevant text within a so-tagged relevant sentence is preceded by an <RH.ANOH . . . > tag 1006 and followed by an </RH.ANOH> tag 1008. The <RH.ANOH . . . > 1006 tag include the names of the concept and subconcept to which the annotated text is relevant, an identifier indicating which relevant sentence the text is in and a number which identifies which annotation this is in sequence for a particular concept. An HTML browser that has not been modified to interpret the special annotation tags provided by the present invention will ignore them and display the document without annotations.

Software Implementation

In a preferred embodiment, software to implement the present invention is written in the Java language. Preferably, the software forms a part of a stand-alone browser program written in the Java language. Alternatively, the code may be in the form of a so-called "plug-in" operating with a Java-equipped web browser used to browse HTML documents including the special annotation tags explained above.

In the foregoing specification, the invention has been described with reference to specific exemplary embodiments thereof. For example, any probabilistic inference method may be substituted for a Bayesian belief network. It will, however, be evident that various modifications and changes may be made thereunto without departing from the broader spirit and scope of the invention as set forth in the appended claims and their full scope of equivalents.

What is claimed is:

1. A computer-implemented method for creating a paper format annotation for an electronically stored document comprising:

accepting user input indicating user-specified concepts of interest;

analyzing said electronically stored document to identify locations of discussion of said user-specified concept of interest; and printing said electronic document to form a plurality of printed pages, wherein each page of said plurality of printed pages is imprinted with an elongated thumbnail image of said document, said elongated thumbnail image providing an indication to a reader of an approximate position of said page within said document, and an indication of said locations of discussion.

2. The method of claim 1 further comprising displaying on a display screen visual indications of said locations of discussion.

3. The method of claim 1 further comprising printing a cover page having indications of said user-specified concepts of interest.

4. The method of claim 3 wherein said cover sheet further comprises:

an indication of at least one page in said document containing said location of discussion of said concepts of interest to said user, said indication based upon a determination of relevance of said locations of discussion to said concepts of interest to said user.

5. The method of claim 3 wherein said cover sheet further comprises:

an indicator of a level of relevance of said document to said concept of interest.

6. The method of claim 1 wherein said analyzing comprises exploiting a probabilistic inference technique to identify said locations.

7. The method of claim 6 wherein said probabilistic interference technique comprises a Bayesian belief network.

8. The method of claim 7 further comprising:

accepting user input indicating a degree of relation between said locations and said concept of interest; and modifying said Bayesian belief network responsive to said degree of relation.

9. The method of claim 6 further comprising:

accepting user input defining a structure of said Bayesian belief network.

10. The method of claim 9 further comprising:

modifying said Bayesian belief network in accordance with content of previously visited electronic documents.

11. The method of claim 1 wherein said printing further comprises:

printing sections of said document surrounding said locations of interest with highlighting.

12. The method of claim 1 further comprising printing an indicator of a level of relevance of said document to said concept of interest.

13. A computer program product for creating a paper format annotation for an electronically stored document comprising:

code for accepting user input indicating user-specified concepts of interest;

code for analyzing said electronically stored document to identify locations of discussion of said user-specified concept of interest;

code for printing said electronic document to form a plurality of printed pages, wherein each page of said plurality of printed pages is imprinted with an elongated thumbnail image of said document, said elongated thumbnail image providing an indication to a reader of an approximate position of said page within said document, and an indication of said locations of discussion; and a computer readable storage medium for holding said codes.

14. The computer program product of claim 13 further comprising code for displaying visual indications of said locations of discussion.

15. The computer program product of claim 13 further comprising code for printing a cover page having indications of said user-specified concepts of interest.

16. The computer program product of claim 15 wherein said cover sheet further comprises:

an indication of at least one page in said document containing said location of discussion of said concepts of interest to said user, said indication based upon a determination of relevance of said locations of discussion to said concepts of interest to said user.

17. The computer program product of claim 15 wherein said cover sheet further comprises:

an indicator of a level of relevance of said document to said concept of interest.

18. The computer program product of claim 13 wherein said code for analyzing comprises code for exploiting a probabilistic inference technique to identify said locations.

19. The computer program product of claim 18 wherein said probabilistic inference technique comprises a Bayesian belief network.

20. The computer program product of claim 19 further comprising:

code for accepting user input indicating a degree of relation between said locations and said concept of interest; and code for modifying said Bayesian belief network responsive to said degree of relation.

21. The computer program product of claim 16 further comprising:

code for accepting user input defining a structure of said Bayesian belief network.

22. The computer program product of claim 21 further comprising:

code for modifying said Bayesian belief network in accordance with content of previously visited electronic documents.

23. The computer program product of claim 13 wherein said code for printing further comprises:

code for printing sections of said document surrounding said locations of interest with highlighting.

24. The computer program product of claim 13 further comprising code for printing an indicator of a level of relevance of said document to said concept of interest.

25. A system for creating a paper format annotation for an electronically stored document comprising:

an electronic storage unit that stores a document;

a printer that prints documents;

a processor unit coupled to said electronic storage device and said printer, said processor unit operative to:

accepting user input indicating user-specified concepts of interest;

analyzing said electronically stored document to identify locations of discussion of said user-specified concept of interest; and printing said electronic document to form a plurality of printed pages, wherein each page of said plurality of printed pages is imprinted with an elongated thumbnail image of said document, said elongated thumbnail image providing an indication to a reader of an approximate position of said page within said document, and an indication of said locations of discussion.

* * * * *